June 8, 1965   H. DE FRANCE ETAL   3,188,516
DYNAMIC IMPACT CONTROL FOR COLOR RECEIVER TUBE
Filed March 19, 1963   9 Sheets-Sheet 3
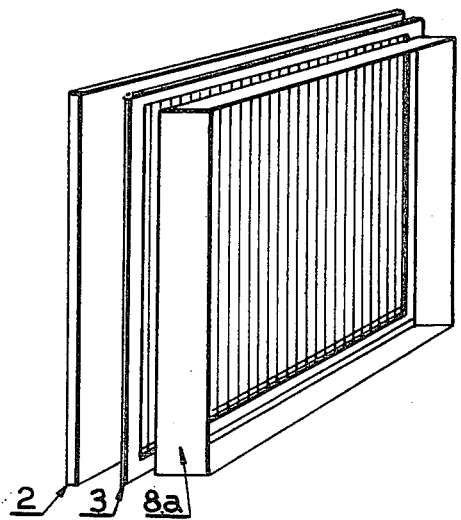
Fig:3.
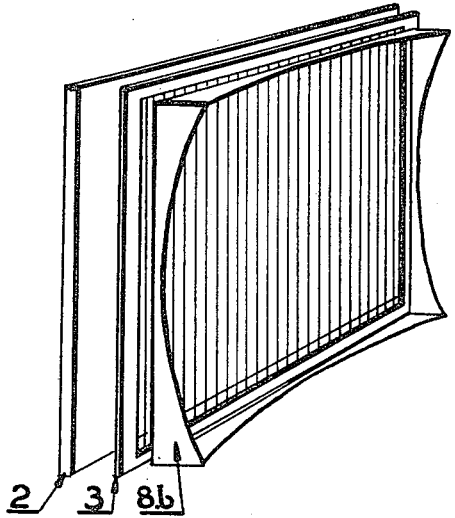
Fig:4.
INVENTORS.
HENRI de FRANCE
ROGER R. CAHEN
BY Kent Relman
AGENT

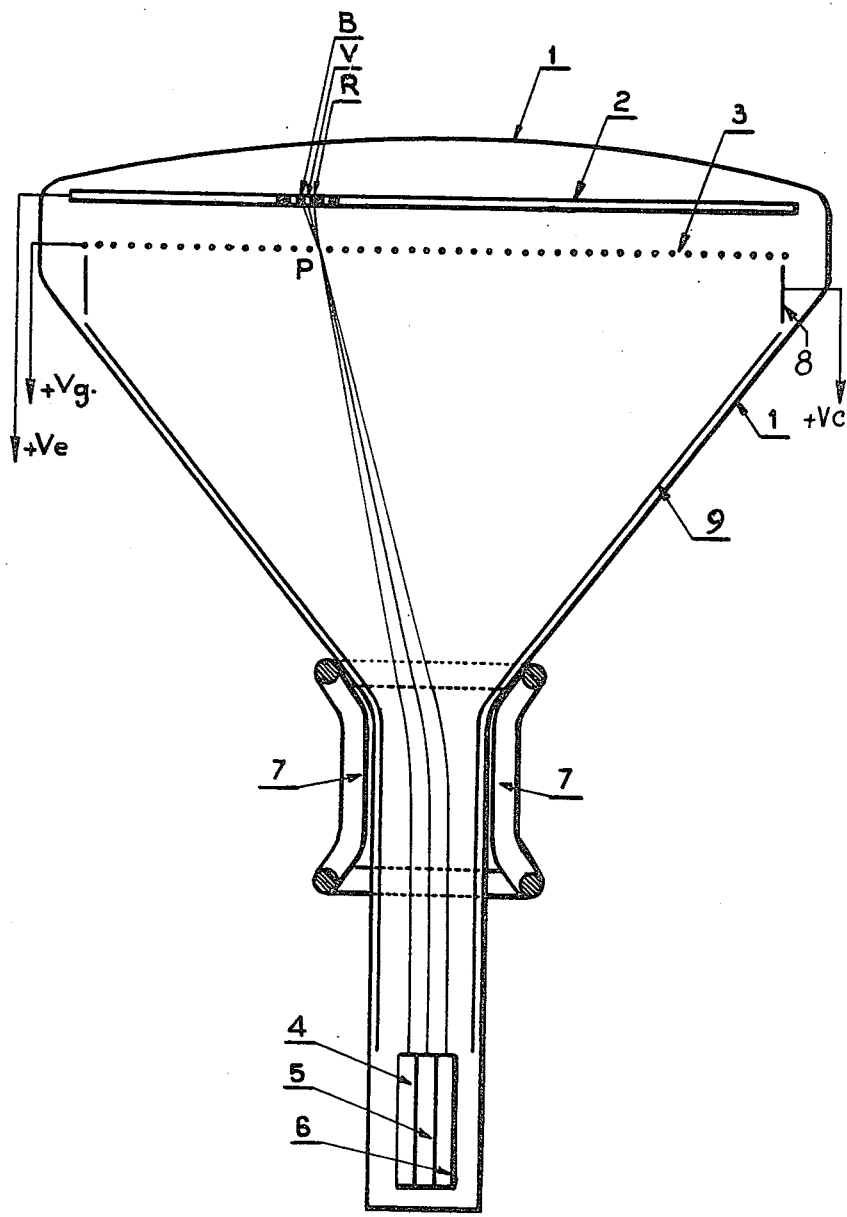
Fig:1

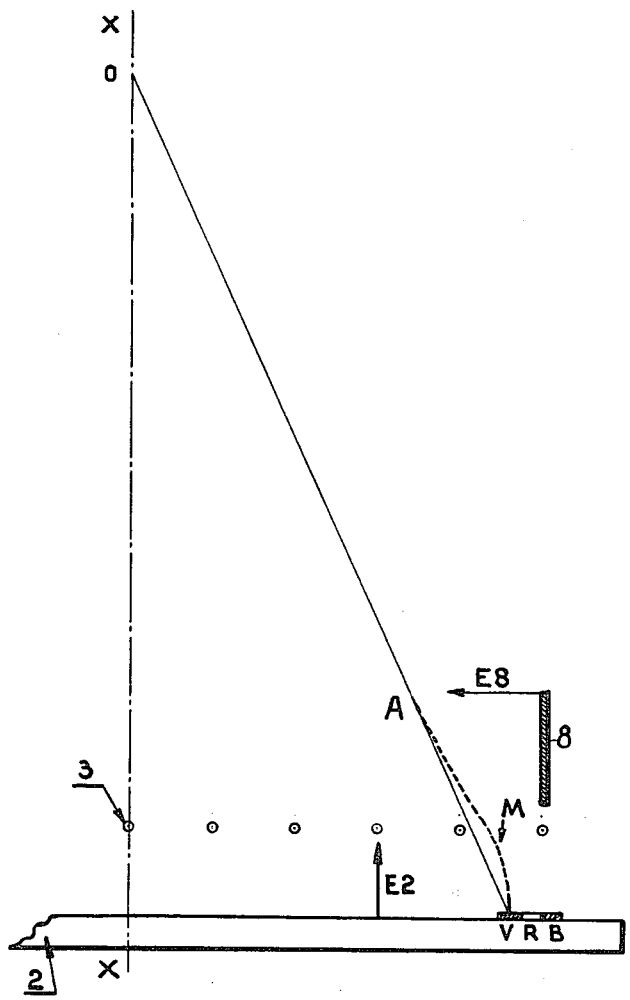
Fig:2

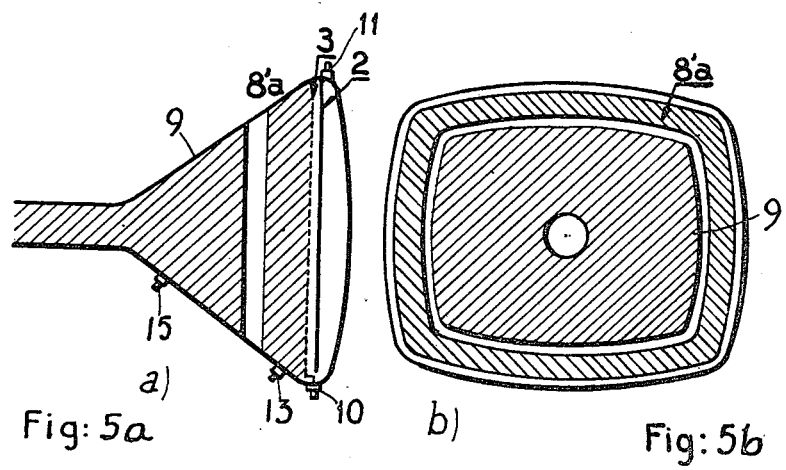
Fig: 5a    Fig: 5b
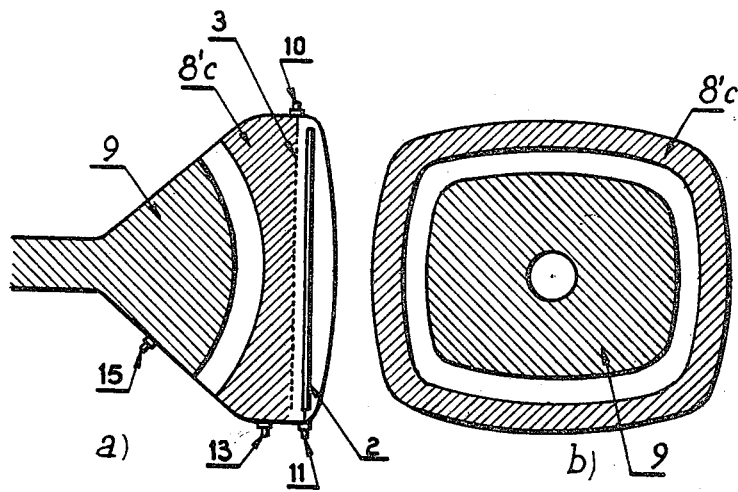
Fig: 6a    Fig: 6b

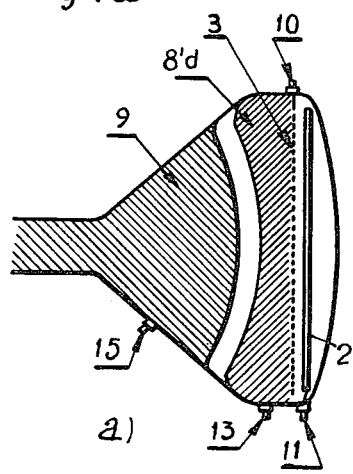
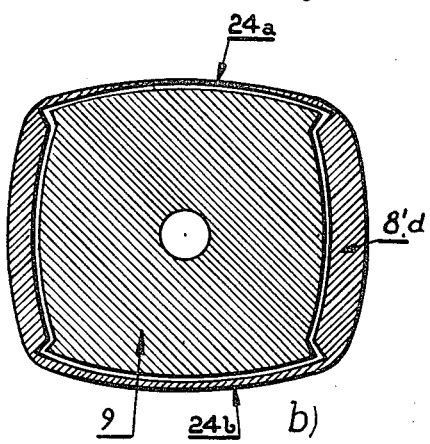
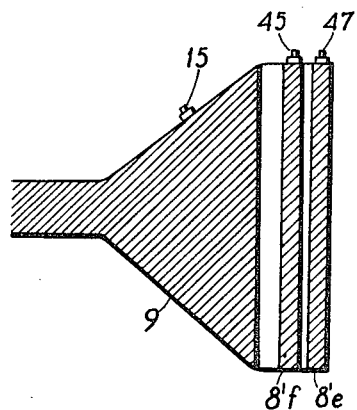

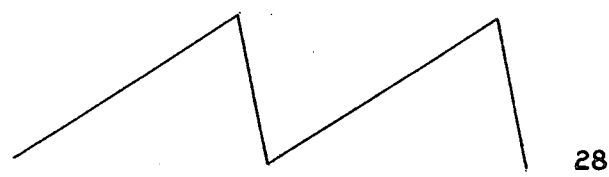
28
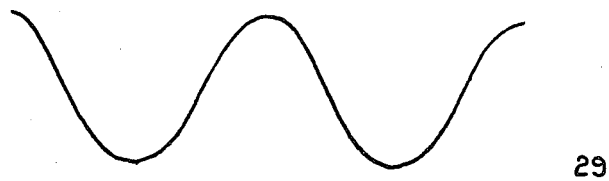
29
30
31
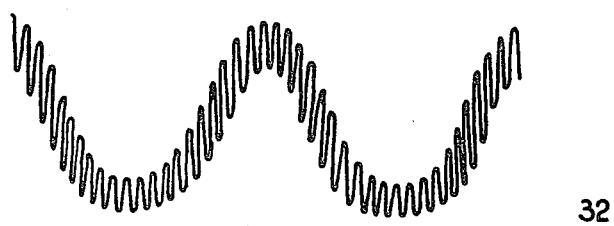
32
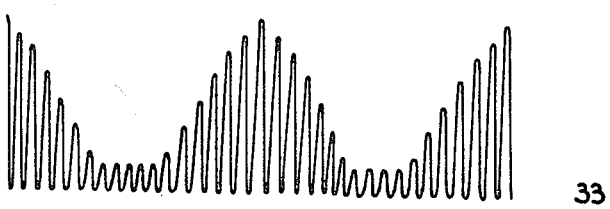
33
Fig:9

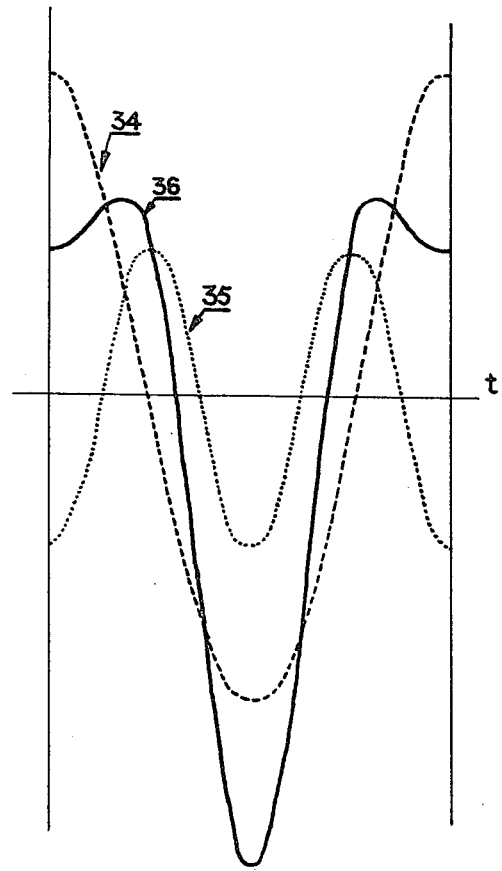
Fig:10

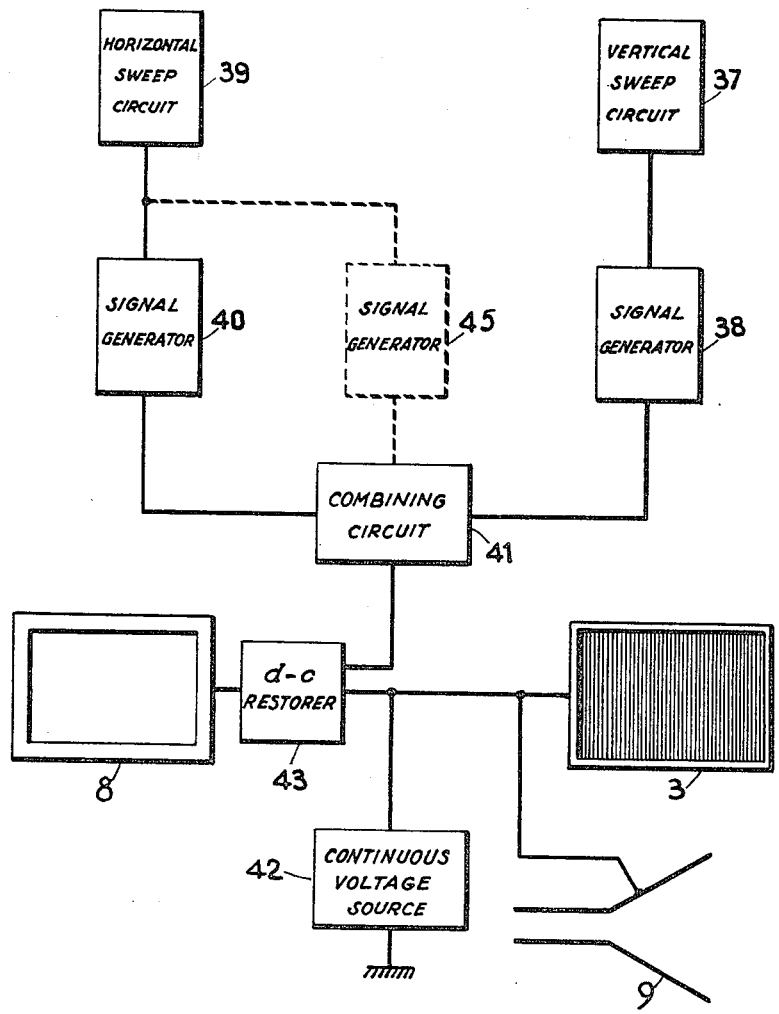
Fig: 11.

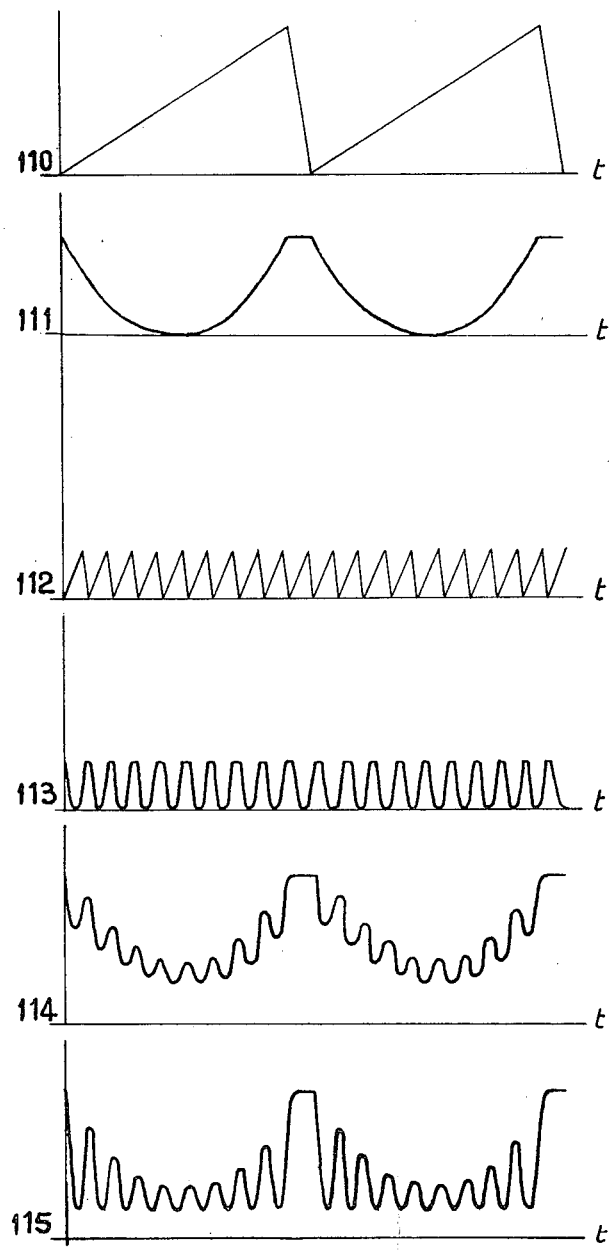
Fig:12.

United States Patent Office 3,188,516
Patented June 8, 1965

3,188,516
DYNAMIC IMPACT CONTROL FOR COLOR RECEIVER TUBE
Henri de France and Roger R. Cahen, Levallois-Perret, France, assignors to Compagnie Francaise de Television, a corporation of France
Filed Mar. 19, 1963, Ser. No. 266,278
Claims priority, application France, Mar. 21, 1962, 891,723; Feb. 26, 1963, 926,000
18 Claims. (Cl. 315—22)

The present invention relates to colour television tubes of the type including a luminescent screen, more particularly with strips of different colours, and a focusing arrangement in the vicinity of the screen, and to image reproducing systems including such tubes.

The screen of a tricolour tube may comprise adjacent and parallel, horizontal or vertical, strips, arranged by groups of three strips, respectively providing the luminous information corresponding to the three primary colours, i.e. generally to red, blue and green. Such tubes are equipped with three or one electron guns.

In the first instance, each one of the three guns has its beam modulated by the signal corresponding to one of the above primary colours.

The three beams sweep in a similar manner the corresponding successive lines of the picture, in the same manner as in a monochrome picture. It is of course necessary to insure that each beam successively impinges on the strips corresponding to the colour by which it is modulated.

If there is only one gun, the latter is sequentially modulated by the three primary colours, while sweeping the picture lines in succession, and it is again necessary to insure, at any given instant, that the strip impinged upon corresponds to the colour signal which modulates the gun at this instant.

It has been suggested to arrange a focusing grid in front of the phosphor strip screen, at a small distance therefrom. The grid wires are parallel to the phosphor strips and their number is equal to that of the groups of three strips corresponding to three different colours.

The grid is raised to a positive potential which is substantially lower than that of the screen, thus building therewith a system of convergent lenses for collecting the electrons of the single divergent beam or of the three divergent beams, and focus them on a limited surface portion of the screen.

Moreover, the electric field prevailing in the grid-screen space imparts to the electrons a post-acceleration which increases the efficiency of the electrons which strike the screen, in so far as luminosity is concerned.

However, this double function is performed somewhat at the cost of an undesirable bending of the beam in the grid-screen space, which bending affects in a different manner and to different extents different screen portions.

This may, in particular, result in that the electrons of a beam, modulated by the information corresponding to a given colour, do not strike, or at least do not strike exclusively the strip corresponding to that colour. In other words the modulating colour signal is no longer matched with the colour of the strip impinged upon, this resulting in a faulty image.

It is an object of the invention to avoid this drawback.

To this end the invention provides a colour television picture tube comprising at least one electron gun for generating a beam; a screen comprising phosphor elements of different colours; an electron permeable focusing electrode parallel to said screen and adapted to form therewith a convergent system for said beam through applying to said focusing electrode a potential lower than the potential of said screen; a horizontal deflection system and a vertical deflection system for sweeping said beam over said focusing electrode; a peripherical electrode surrounding the space portion swept by said beam between said gun and the vicinity of said focusing electrode; and at least one correcting electrode, located between and insulated from said peripherical electrode and said focusing electrode, and adapted and shaped for attracting the electrons from said beam and so to compensate at last partially, in at least one direction parallel to said screen, the deviation imparted to said beam in the space portion comprised between said focusing electrode and said screen; said tube being designed to be operated with a peripherical electrode potential equal to that of said focusing electrode and with a correcting electrode potential, which is either constant and greater than said focusing electrode potential or variable as a function of the instantaneous position of said beam but never lower than said focusing electrode potential.

According to a preferred embodiment of the invention, the tube is equipped with three guns, arranged in such a manner that their respective beams converge on the focusing electrode, the screen being a phosphor strip screen and the focusing electrode being a grid whose wires are parallel to the strips.

It is also an object of the invention to provide a colour image reproducing system including a tube according to the invention.

In a preferred arrangement of this system, means are provided for bringing the correcting electrode to a potential which varies as a function of the instantaneous position of the beam or beams.

The invention will be best understood from the following description and appended drawings:

FIG. 1 is a tricolour tube according to the invention;
FIG. 2 is a graph explaining the principle of the correction according to the invention;
FIGS. 3 to 8 show various embodiments of the correcting electrode according to the invention;
FIGS. 9 and 10 are graphs indicating how a variable level correcting signal can be obtained;
FIG. 11 is a block diagram of a colour image receiver system according to the invention; and
FIG. 12 is another graph illustrating a variable level correcting signal.

The same reference numerals have been used to designate the same elements throughout all the figures.

Referring now to FIG. 1, this figure shows, very diagrammatically, the main elements of a tube 1 according to the invention with a screen comprising vertical phosphor strips, a focusing grid and three guns, the grid and the screen being plane and rectangular. The side walls of the envelope are coated with a conductive coating 9, building up a peripherical electrode.

Screen 2 comprises red, green and blue strips R, V and B, arranged by groups of three strips of different colours. Only a few have been illustrated in FIG. 1. Their dimensions have been exaggerated for the sake of clearness. In fact, the tube comprises a large number of such groups of three strips, each group providing in each horizontal line one point of the colour image.

In front of screen 2, there is arranged a grid 3 formed of fine wires, in parallel relationship to the strips, the number of the wires corresponding to the number of groups of three strips. The distance of grid 3 to screen 2 is also greatly exaggerated in the drawing.

These guns 4, 5 and 6, having an electrostatic focusing system, are arranged in such a manner that their beams converge at any given instant at a point P located approximately in the plane of grid 3.

The convergence of the three beams is obtained for instance by orienting in a slightly different manner the respective axes of guns 4, 5 and 6 with respect to the axis of the tube and/or by electron-optical means (not illustrated). Such means are well known in the art and have therefore not to be described.

Point P moves linewise perpendicularly to the grid wires, under the action of the deflecting voltages applied to an electro-magnetic deflection arrangement, of which only one coil 7 is seen in the figure.

Screen 2 is brought to a potential Ve, which is high with respect to that of the cathodes of the guns and grid 3 to a lower positive potential Vg, the grid and screen assembly forming a convergent cylindrical lens system for the electron beams from the guns.

The conductive coating 9 of the inner wall of the tube, i.e. the peripherical electrode, is raised to the highest potential of the guns. The potential Vg of a grid is substantially equal thereto.

According to the invention, the tube is also provided with a correcting electrode 8, which, in the embodiment shown by way of example, is built up by a conductive element which extends along the periphery of grid 3 and normally thereto.

The electrode of each of the guns 4, 5 and 6 which is at the highest potential and the peripherical electrode built up by coating 9 are brought to the same potential Vg as the grid.

The beams produced by guns 4, 5 and 6 are respectively modulated by red, green and blue colour signals.

In order to explain the operation of the tube, it will first be assumed that there is no electrode 8 and that electrode 9 extends until the immediate vicinity of grid 3.

The equipotentiality of those electrodes which are brought to potential Vg insures a rectilinear trajectory of the beams between the deflection center O, shown in FIG. 2 and located on the longitudinal axis XX of the tube, and grid 3. The beams penetrate then into the space between grid 3 and screen 2.

For a given distance between grid 3 and screen 2 and by suitably selecting their respective potentials, thus determining the convergence of the grid-screen system, and by suitably adjusting the remainder of the electron-optical system of the tube, the beams modulated by the red, green and blue colour signals should respectively impinge upon the red, green and blue strips of the three strip group in front of which point P is located at the moment considered.

In fact such a structure cannot operate perfectly in the assumed conditions. The field in the space between grid 3 and screen 2 is not uniform, but, in a first approximation, it may be assumed that it exerts on each beam, while it is crossing the grid, intermediate two wires thereof, a force which may be represented by a vector perpendicular to the planes of the screen and the grid.

Thus, an electronic beam undergoes in the space between the grid and the screen, not only an acceleration and a focusing, which are desirable, but also an undesirable deflection tending to displace the point of impact of the beam on the screen and presenting a centripetal character with respect to the centre of the screen.

This undesired deviation is radial i.e. directed towards the centre of the screen, is nil at the centre of the screen and broadly speaking increases (not linearly) with the distance r of the desired point of impact from the centre of the screen.

This radial deviation has a horizontal and a vertical component.

For a given value of r and a given value of the radial deviation, the horizontal and vertical components of this deviation increase respectively with the absolute value of the abscissa and of the ordinate of the desired point of impact in a system of rectangular axes, built up by the horizontal and the vertical axes passing through the centre of the screen.

In the absence of this undesired deviation of the beam in the space between the grid and the screen, it would be an easy thing, with a screen having parallel strips of equal width and a grid of parallel equidistant wires, i.e. with a grid and a screen whose manufacture is rather economical, to obtain, through a suitable adjustment of the directions of the three beams, that the beams, respectively produced by guns 4, 5 and 6, respectively impinge upon the desired strips of the groups of strips bounded by the wires of the grid, as shown in FIG. 1. The beams would then have rectilinear trajectories between the deflection centre O and screen 3.

However, if this adjustment is made for the central portion of the screen, it is not suitable for the remainder thereof, on account of the aforementioned deviation.

The radial deviation results then in a distortion of the geometry of the image and consequently distorts the colour distribution: if, for example, only gun 4 is operated to emit a constant red signal, instead of having the whole of the screen uniformly illuminated in red, these appear, in the vertical lateral regions of the screen, zones of other colours which are limited by curves concave towards the centre.

FIG. 2 shows diagrammatically in the same plane as FIG. 1, a portion of grid 3 and screen 2, a group of three red, blue and green lines and the compensating electrode 8, XX being the axis of the tube and O the deflection centre.

If there were no undesired deviation in the space between grid 3 and screen 2, electrode 8 being then, of course, unnecessary, a beam issued from O in the direction OV would propagate in this direction without deviating therefrom and would impinge as desired on the green strip V.

Still in the absence of electrode 8 but taking into account the undesired deviation in the grid-screen space, the beam undergoes in this space, a deflection which causes it to impinge on the screen leftwards of strip V, say, for example on strip B of the adjacent group of the strip (not illustrated).

By bringing now electrode 8 to a suitable correction potential, which is higher than that of electrode 9 and grid 3, a field E8 is created which attracts towards electrode 8 the electrons of the beam and, when the beam reaches point A, opposite the edge of electrode 8, it undergoes a deflection which, if it is correctly calculated, causes the beam to impinge upon strip V.

The electron path will thus present an inflection point M, located approximately in the plane of grid 3.

In FIG. 2, the beam considered being in the median horizontal plane, the unwanted horizontal deviation due to the field in the space between the grid and the screen is identical with the unwanted radial deflection.

This deviation increases with the distance to the centre of the screen, i.e. with the absolute value of the abscissa of the considered point.

Along any horizontal line, other than that whose ordinate is zero, the horizontal component of the deviation increases with the abscissa all the stronger as the absolute value of the ordinate of the horizontal line considered is greater.

For a value lower than a predetermined threshold value, the horizontal deviation does not affect the colour. Above this threshold value, the colour obtained is no longer the right one. In actual practice, for a maximum sweeping angle (angle between the instantaneous position of the beams and the longitudinal axis XX of the tube) greater than 45° and with phosphor strips about 25 mm. broad, the undesired horizontal deviation may be such that it corresponds to two or three strips. The undesired horizontal deviation is then, even along the horizontal axis, much stronger than shown in FIG. 2.

The compensating deviation obtained by means of the correcting electrode has therefore to vary within broad limits with the instantaneous position of the beams, in accordance with a rather complex law.

This compensating deviation may be obtained by means of a compensating electrode, the general structure of which has been indicated above, to which a fixed or a variable correcting potential Vc is applied as will be indicated hereinafter.

However, experience shows that it is generally difficult to vary the correcting effect in such a manner that it would adequately follow up the defects to be corrected, at least with a fixed correcting potential.

In this latter case, a variation of the correction effect is however obtained due to the fact that the field produced by an electric charge varies in inverse ratio to the square of the distance.

Experience shows that, either with a fixed or with a variable correction potential, a satisfactory compensation is obtained all the easier as it is effected nearer to the grid.

It is therefore advantageous to locate the correction electrode as near grid 3 as technological considerations allow it.

On the other hand, when the tube is equipped with three guns, as in the instance here considered, and the paths of three separate beams have to be corrected simultaneously, this correction is simplified, if it is achieved at or about the point where the beams converge, i.e. in the vicinity of grid 3.

It should be noted that, since the undesirable deflection presents, roughly and disregarding the marginal effects, a symmetry of revolution about axis XX of the tube i.e. the axis which is normal to the screen at its centre, the correction may be simplified by using a circular correcting electrode surrounding the area swept by the beam or beams and presenting the same symmetry of revolution.

In fact, the tubes currently used have a rectangular screen and it may be sometimes difficult to accommodate therein a circular electrode.

On the other hand, for technological reasons, it may be preferred to form the correcting electrode as a conductive coating applied, in the same manner as the peripherical electrode 9, on the internal wall of the envelope, in the vicinity of the grid. In this case the correcting electrode has substantially the same contour as the envelope of the tube, i.e. is roughly rectangular if the flared portion of the envelope is such.

The use of a variable correction potential presents, among others, the advantage of facilitating a satisfactory compensation for the undesirable radial deflection by means of a correcting electrode in the shape of a conductive frame having a rectangular or roughly rectangular contour.

FIG. 3 shows a rectangular correction electrode 8a in the shape of a metal conductive frame, the walls of which are normal to grid 3 and screen 2.

The correcting electrode 8b, shown in FIG. 4, differs from the electrode 8a of FIG. 3 in that the walls of the frame are broader at the angles than at the centre portions. This correcting electrode, which will be referred to as being of the concave type, has, other things being equal, a more pronounced correcting action on the screen portions which are the remotest from the centre of the screen.

FIGS. 5 and 6 show correcting electrodes formed as a conductive coating on the internal wall of a tube whose flared portion has a rectangular cross-section.

FIG. 5a represents in elevation a tube of the type shown in FIG. 1. It comprises a peripherical electrode 9, a screen 2 and a grid 3, with their respective supply terminals 15, 11 and 10, and a correction electrode 8′a of the type just mentioned. While the correction electrode is inclined to the screen, i.e. not normal thereto, the resulting field presents however a component normal to the axis of the tube, thus making the correction possible. Electrode 8′a is fed through terminal 13.

FIG. 5b shows the same tube in cross-section, normally to the axis of the tube.

FIG. 6a shows, in elevation, a tube of the same type, shaped in a slightly different manner. Due to the shape of the tube, which makes easier the accommodation of the terminals, electrode 8′c has a portion which is normal to grid 3 and a portion which is inclined thereto. On the other hand, electrode 8′c is of the concave type, shown in FIG. 4. Electrode 9 is so shaped that the distance between its edge and the edge of electrode 8′c is constant.

FIG. 6b shows the same tube, in cross-section.

The embodiments of the correcting electrode so far considered allow a modification of the impingement points of the beams both vertically and horizontally. In fact, the vertical deflection, i.e. that parallel to the phosphor-strips, results only in a geometrical distortion, which practically does not affect the quality of the image. Experience has shown that it suffices to correct the horizontal deflection, which simplifies to a substantial degree the determination of the optimum variable potentials to be applied to the correction electrode as a function of the instantaneous position of the beams, and allows a better compensation in the horizontal direction.

When it is desired to correct only the horizontal deflection, a compensating electrode may be built up by two active portions, whose sections through a plane parallel to the screen are roughly parallel to the phosphor strips and which are electrically connected together, preferably by means of a double connection so as to make the device symmetrical, so may be fed through a single input.

FIG. 7a is an elevational view of a tube having a rectangular screen, of the same type as illustrated in FIG. 6, except that, as mentioned hereinabove, the correcting electrode 8′d, which is of the concave type, is reduced to two parallel portions, the sections of which, through a plane parallel to the screen, are roughly parallel to the phosphor strips. These two portions are electrically connected together by two very thin conducting portions 24a and 24b, which exert practically no action on the beam. Electrode 8′d is fed through a single terminal 13.

It is to be understood that, if the phosphor strips are horizontal, the two electrode portions 8′d have also to be horizontal.

FIG. 8 is a further alternative embodiment of the tube. This tube is of the type shown in FIG. 6. It comprises two correcting electrodes 8′e and 8′f. This alternative embodiment is of advantage when it is desired to simplify the supply circuits which provide a variable correction field. A variable potential at the line-frequency may be applied through a terminal 47 to electrode 8e and a potential at the field frequency may be applied through a terminal 45 to electrode 8′f, or vice-versa.

Also three signals may be respectively applied to three correction electrode elements.

The voltage to be applied to the correcting electrode depends on the tube type.

It is to be noted that, by using a correcting voltage, whose value is a function of the absolute values of the abscissa and of the ordinate of the point where the beam impinges on the screen, and by suitably selecting this function, at least an approximative correction may be obtained both in the horizontal and in the vertical direction. Of course, this function will have to be determined, at least in part, by cut and trial.

It is to be noted that a substantial simplification is achieved with phosphor strip tubes due to the fact that the geometrical distortions of the image due to the considered undesired deflections have no practical bearing and do not go beyond those which are current in black and white television.

What matters then is the correction of the undesired beam deviation which affects the colour rendition, i.e. the horizontal component of the deviation with vertical phosphor strips and the vertical component of the deviation with horizontal phosphor strips.

Assuming the strips to be vertical, either an electrode, which is active only in the horizontal directions, or an electrode which is active both in the horizontal and in the vertical directions, may be used. However, in the latter case, the correcting potential should be adjusted to obtain as perfect a correction as possible in the horizontal direction, disregarding the result obtained in the vertical one.

In the case of a tube wherein the sweeping angles are rather small, a substantial improvement may be achieved even with a fixed potential.

In this case an electrode of the concave type, as concerns the horizontally active portions, will insure a better correction, this electrode having, other things being equal, an increased action in the lower and upper portions of the image.

Actually, it will be necessary, with comparatively large maximum sweeping angles, to apply to the correcting electrode a potential which varies both at the line and at the field frequency.

In this case an electrode may be used which is either concave or not. Generally speaking, the shape of the electrode may be modified to provide a further adjustment of the correcting effect.

In a simple embodiment, the variable correction voltage is applied to a single electrode and is the sum of a constant voltage, which is eqial to that applied to electrode 9 and to grid 3, and of a variable signal, which is equal to the sum, or to the product of modulation by each other, of two signals having respectively the line and the field frequency, this variable signal being shifted, so as to be never negative.

It is obvious that the minima of the variable components at the line and the field frequency, must correspond to the vertical and to the horizontal axis of the screen, respectively.

In FIG. 9, the saw-tooth signals at the field frequency for the vertical deflection of the beams are shown at 28 and, at 29, the sinusoidal signals of the same frequency.

Similarly, the saw-tooth signals at the line frequency for the horizontal deflection of the beams are shown at 30, with the time at a greatly enlarged scale, and the sinusoidal signals of the same frequency are shown at 31. These saw-tooth signals are represented in the conventional manner, disregarding the strong line retrace impulse.

Signals 32 and 33 are derived from signals 29 and 31, and correspond respectively to the sum and to the product of modulation by each other of these signals.

It is possible to use signal 32 or 33, as the case may be. Both present a level which increases, as does the defect to be corrected, as a function of the absolute value of the abscissa, and as a function of the absolute value of the ordinate of the point which is swept at the instant considered on the screen.

Experience shows that it may happen that it is advantageous to modify somewhat the shape of the sinusoidal signal at the line frequency $f$ by combining it with another sinusoidal signal of a frequency $2f$, $3f$ . . .

FIG. 10 shows, by way of example, the sinusoidal signal 34 at the line frequency onto which is superimposed a signal 35, having twice its frequency and the central minimum of which corresponds to the vertical axis of the tube. The sum is represented by signal 36, which is the partial correction signal at the line frequency.

This provides a simple means for modifying the shape of the correction signal during the time intervals corresponding to the sweeping of the vertical marginal areas of the picture.

FIG. 11 is an embodiment of a circuit of a receiver according to the invention, aimed at deriving the total voltage applied to a single correction electrode from a variable signal of the type of signals 32 or 33, shown in FIG. 9.

In this figure, the field deflection generator 37 delivers a saw-tooth signal at the corresponding frequency. The saw-tooth signal, i.e. signal 28 in FIG. 9, is applied to device 38 which derives therefrom the fundamental sinusoidal component at the field frequency, with the above mentioned phase.

Also, the line deflection generator 39 delivers a saw-tooth signal at a corresponding frequency, i.e. signal 30 in FIG. 9 which is applied to device 40 which provides the sinusoidal component at the line frequency with the phase indicated.

System 38 may be, for example, built up by a triode or pentode tube, to the control grid of which are applied saw-tooth signals at the field frequency, the anode circuit being tuned to the field frequency and the desired phase being obtained through a feedback between anode and grid.

Of course, instead of using saw-tooth signals at the field frequency, any other suitable signal at the field frequency, derived from the vertical deflection circuit of the tube, may be used.

Turning now to system 39, the saw-tooth signals at the line frequency may be applied, through the intermediary of a tuned circuit, to the control grid of a triode or a pentode. the anode circuit of which is tuned to the line frequency, the desired phase being obtained by slightly modifying the tuning of the input circuit.

In the same manner as above, a signal at the line frequency other than the sweeping saw-tooth signal may be used. However, this latter signal is particularly convenient because of strong line retrace pulses which in fact build up the essential of the input signal.

The sinusoidal signals 29 and 31 are applied to a circuit 41, which is either a circuit for adding these signals, or a modulating circuit for modulating the sinusoidal signals at the line frequency by the sinusoidal signals at the field frequency according to whether correction signals 32 or 33 are used.

Grid 3 and electrode 9 are brought to the same positive potential by the supply source 42. A circuit 43 superposes on this potential the composite correction voltage derived from system 41, the latter being shifted so that its minima are brought to the zero level, and that the minimum values of the potential supplied by circuit 43 correspond to the grid potential.

To this end, circuit 43 may include a conventional D.C. restorer diode circuit.

If the signal at the line frequency comprises a harmonic of this frequency, circuit 39 feeds a second system 45 shown in dotted lines in FIG. 11.

When a signal at the line frequency of the type shown in FIG. 10 is used, this harmonic has a frequency double the line frequency. It is provided with the desired phase by system 45 and is applied to an additional input of circuit 41.

Generator 45 may have the same general structure as generator 40, with this difference that it is tuned to a frequency equal to twice the line frequency.

Of course, amplifiers having a suitable gain may be inserted in the circuit of FIG. 11, to bring the various components to the desired level.

If a tube with two correcting electrodes is used, such as for example that shown in FIG. 8, one will apply to one of the electrodes a signal, obtained by superposing the grid voltage on the signal having the line frequency, this signal being shifted in such a manner that the sum signal should not drop below the grid voltage. This may be obtained by means of a circuit such as the circuit 43 of FIG. 8, to which the grid voltage and the signal of the line frequency are applied.

The second electrode also receives a variable potential, the minimum value of which is never lower than the grid voltage, this potential being derived in the same way as above, except that the line frequency signal is substituted by the field frequency signal.

It is of course possible, taking into account the prevailing conditions, to use another correction potential. For example, the line and field frequency sinusoidal signals may be substituted by parabolic signals of the same frequencies shown in FIG. 12.

In this figure, signals 110 are the saw-tooth signals at the field frequency which are used for the vertical deviation of the beams. Signals 111 are parabolic signals of the same field frequency, and are at a minimum at the instants corresponding to the sweeping of the horizontal axis of the screen. Signals 112 are the horizontal-sweep saw-tooth signals. Signals 113 are parabolic signals at the line frequency, presenting a minimum at the instants corresponding to the sweeping of the points of the vertical axis of the screen.

Signals 114 and 115 are derived from signals 111 and 113 and correspond respectively to the sum and to the product of modulation of the latter by each other, increased by the grid voltage, the latter being much higher, relative to the amplitude of the variable component, then this appears in the figure.

It was assumed in this figure that the portions of signal 111 and 113 corresponding to the line or field retrace periods were clipped.

It is possible to apply to the correction electrode, either signal 114 or signal 115, whichever is more advantageous.

The mean optimum level and the peak to peak difference between signals 114 and 115 may be determined experimentally.

The general layout of the supply circuit may of course be the same as in the case of the elementary sinusoidal signals, provided the sinusoidal signal generators are substituted by parabolic signal generators.

If there is only one correction electrode, it is possible to use the circuit of FIG. 11 (disregarding the portion thereof shown in dotted lines), each of circuits 38 and 40 being then built up by an amplifying, and, if necessary, a phase-shifting circuit, fed by the parabolic signal, which is normally found respectively at the line and field frequency in the corresponding sweep circuits.

The invention has been described in relation with a tube of the type illustrated in FIG. 1, assumed to comprise a rectangularly shaped screen, with vertical strips and three guns, this being in no way a limiting case.

A correcting electrode consisting of a conductive coating on the inner wall of the tube is of interest only if this does not result in too great a distance between the electrode and the periphery of the grid, which may happen in particular in the case of a circular tube provided with a rectangular screen.

A rectangular correcting screen is of particular interest with a tube of the same shape.

It is moreover to be understood that the correction electrode according to the invention may be brought to a variable potential, which would not be exactly one of those described, but suitably selected taking into account the geometrical or electric characteristics of the tube.

In the case the tube comprises a phosphor strip screen, the latter may of course comprise groups of strips of three colours wherein the strips do not have the same breadth, for example with a view to taking into account the luminous efficiency of the strips of the different colours; also the strips could be arranged otherwise than by groups of three.

It would also be possible, although less economical in so far as the manufacturers of screens are concerned, to design the successive strips in such a manner as to pre-correct geometrically the undesired deviations, for example by making the strips not rectilinear and of non uniform width.

In this case, the invention is still of interest since it makes it possible by means of a variable potential, to better the correction thus effected.

The invention still applies if the screen and grid are not plane. In this case, the expression "a plane parallel to the screen" should be taken to designate "a plane parallel to a plane tangent to screen at the centre thereof."

What is claimed is:

1. A colour television picture tube comprising: at least one electron gun for generating a beam; a screen comprising phosphor elements of different colours; an electron permeable focusing electrode parallel to said screen and adapted to form therewith a convergent system for said beam, said system including means for applying to said focusing electrode a potential lower than the potential of said screen; a horizontal deflection system and a vertical deflection system for sweeping said focusing electrode with said beam; a peripherical electrode surrounding the space portion swept by said beam between said gun and the vicinity of said focusing electrode; at least one correcting electrode, located between and insulated from said peripherical electrode and said focusing electrode, and shaped for attracting the electrons from said beam so as to compensate, at least partially, in at least one direction parallel to said screen, the deviation imparted to said beam in the space portion comprised between said focusing electrode and said screen; said tube having means for applying to said peripherical electrode a potential equal to that of said focusing electrode and further means for applying to said correcting electrode a potential which is variable as a function of the instantaneous position of said beam.

2. A colour television picture tube according to claim 1, wherein said correcting electrode is physically separated from the internal wall of said tube.

3. A colour television picture tube according to claim 1, wherein said correcting electrode is built up by a conductive coating on the internal wall of said tube.

4. A colour television picture tube comprising: three guns for generating three beams; a screen comprising phosphor elements of different colours; an electron permeable focusing electrode parallel to said screen and adapted to form therewith a convergent system for said beams through applying to said focusing electrode a potential lower than the potential of said screen; said guns being adapted for converging said beams in the immediate vicinity of said focusing electrode; a horizontal deflection system and a vertical deflection system for simultaneously deflecting said beams and sweeping therewith said focusing electrode; a peripherical electrode surrounding the space portion swept by said beams between said guns and the vicinity of said focusing electrode; at least one correcting electrode, located between and insulated from said peripherical electrode and said focusing electrode, and shaped for attracting the electrons from said beams so as to compensate, at least partially, in at least one direction parallel to said screen, the deviation imparted to said beams in the space porton comprised between said focusing electrode and said screen; said tube having means for applying to said peripherical electrode a potential equal to that of said focusing electrode and further means for applying to said correcting electrode a potential which is variable as a function of the instantaneous position of said beams.

5. A colour television picture tube comprising: three guns for generating three beams; a screen comprising phosphor elements of different colours; an electron permeable focusing electrode parallel to said screen and adapted to form therewith a convergent system for said beams through applying to said focusing electrode a potential lower than the potential of said screen; said guns being adapted for converging said beams in the immediate vicinity of said focusing electrode; a horizontal deflection system and a vertical deflection system for simultaneously deflecting said beams and sweeping therewith said focusing electrode; a peripherical electrode surrounding the space portion swept by said beams between said guns and the vicinity of said focusing electrode; at least one correcting electrode, located between and insulated from said peripherical electrode and said focusing electrode, for attracting the electrons from said beams; the cross-section of said correcting electrode in a plane parallel to said screen being approximately rectangular, said correcting electrode comprising two portions whose cross-sections in said plane are substantially horizontal and two portions whose cross-sections in said plane are substantially vertical; said tube having means for applying to said peripherical electrode a potential equal to that of said focusing electrode and further means for applying to said correcting electrode a potential which is never lower than said focusing electrode potential.

6. A colour television picture tube comprising: at least one gun for generating a beam; a screen comprising phosphor elements of different colours in the shape of strips at least approximately parallel to a given direction of said screen; an electron permeable focusing electrode parallel to said screen, said focusing electrode being adapted to form with said screen a convergent system for said beam through applying to said focusing electrode a potential lower than the potential of said screen; a horizontal deflection system and a vertical deflection system for deflecting said beam and sweeping therewith said focusing electrode; a peripherical electrode surrounding the space portion swept by said beam between said gun and the vicinity of said focusing electrode; at least one correcting electrode, located between and insulated from said peripherical electrode and said focusing electrode, for attracting the electrons from said beam; said correcting electrode comprising at least two portions whose cross-sections in a plane parallel to said screen are at least approximately parallel to the direction of said strips, and are broader at their ends than at their centre; said tube having means for applying to said peripherical electrode a potential equal to that of said focusing electrode and further means for applying to said correcting electrode a potential which is never lower than said focusing electrode potential.

7. A colour television picture tube comprising: at least one gun for generating a beam; a screen comprising phosphor elements of different colours; an electron permeable focusing electrode parallel to said screen and shaped as a grid formed by vertical wires, said focusing electrode being adapted to form with said screen a convergent system for said beam through applying to said focusing electrode a potential lower than the potential of said screen; a horizontal deflection system and a vertical deflection system for deflecting said beam and sweeping therewith said focusing electrode; a peripherical electrode surrounding the space portion swept by said beam between said gun and the vicinity of said focusing electrode; a first and a second correcting electrode, located between and insulated from said peripherical electrode and said focusing electrode for attracting the electrons from said beam; said tube having means for applying to said peripherical electrode a potential equal to that of said focusing electrode and further means for applying to said correcting electrodes respective potentials, which are variable as a function of the instantaneous position of said beam.

8. A colour television image reproducing system including a picture tube, said tube comprising: at least one gun for generating a beam; a screen comprising phosphor elements of different colours; an electron permeable focusing electrode parallel to said screen and adapted to form therewith a convergent system for said beam through applying to said focusing electrode a potential lower than the potential of said screen; a horizontal and a vertical deflection system for deflecting said beam and sweeping therewith said focusing electrode; a peripherical electrode surrounding the space portion swept by said beam between said gun and the vicinity of said focusing electrode; at least one correcting electrode, located between and insulated from said peripherical electrode and said focusing electrode, and shaped for attracting the electrons from said beams so as to compensate, at least partially, in at least one direction parallel to said screen, the deviation imparted to said beam in the space portion comprised between said focusing electrode and said screen; said image reproducing system further including a direct current voltage source for applying said focusing electrode potential to said focusing electrode and also to said peripherical electrode, a horizontal and a vertical sweep circuit for respectively feeding said horizontal and vertical deflection systems, and further means for applying to said correcting electrode a potential which is variable as a function of the position occupied at any given instant by said beam under the action of said deflection systems; said further means comprising a further circuit fed by at least one of said sweep circuits, for delivering a periodic component of said variable potential and means connected to said further circuit and to said direct current voltage source for supplying said variable potential as the sum of said periodic component, shifted so as to bring its minima to zero level, and of said direct current voltage.

9. A system according to claim 8, wherein said means connected to said further circuit and to said direct current voltage source are a circuit of the direct current restorer type.

10. A colour television image reproducing system including a picture tube, said tube comprising: three guns for generating three beams; a screen comprising phosphor strips of different colours; an electron permeable focusing electrode parallel to said screen and adapted to form therewith a convergent system for said beams through applying to said focusing electrode a potential lower than the potential of said screen; said guns being adapted for converging said beams in the immediate vicinity of said focusing electrode; a horizontal deflection system and a vertical deflection system for simultaneously deflecting said beams and sweeping therewith said focusing electrode; a peripherical electrode surrounding the space portion swept by said beams between said guns and the vicinity of said focusing electrode; at least one correcting electrode, located between and insulated from said peripherical electrode and said focusing electrodes, and shaped for attracting the electrons from said beams so as to compensate, at least partially, in at least the direction of said screen normal to said strips, the deviation imparted to said beams in the space portion comprised between said focusing electrode and said screen; said image reproducing system further including a direct current voltage source for applying said focusing electrode potential to said focusing electrode and to said peripherical electrode, a horizontal and a vertical sweep circuit for respectively feeding said horizontal and vertical deflection systems, and further means for applying to said correcting electrode a potential which is variable as a function of the instantaneous position of said beams; said further means comprising: first generating means connected to said horizontal sweep circuit for receiving from said horizontal sweep circuit a first input signal at the line frequency and deriving therefrom a first partial signal at said line frequency presenting a minimum level when the points of the vertical axis of said screen are swept by said beams, second generating means connected to said vertical sweep circuit, for receiving from said vertical sweep circuit a second input signal at the field frequency and deriving therefrom a second partial signal at said field frequency presenting a minimum level when the points of the horizontal axis of said screen are swept by said beams; means, coupled to said first and second generating means, for combining said first and second partial signals to derive therefrom a periodic component of said variable potential; and means, coupled to said combining means and to said direct current voltage source, for supplying said variable potential as the sum by said beams; means, coupled to said first and second of said periodic component, shifted so as to bring its minima to zero level, and of said direct current voltage.

11. A system according to claim 10 wherein said combining means is an adding means.

12. A system according to claim 10 wherein said combining means is a means for obtaining the modulation product of one of said partial signals by the other.

13. A system according to claim 10 wherein said first generating means supplies a sinusoidal signal.

14. A system according to claim 10 wherein said first generating means supplies a signal which is the sum of a sinusoidal signal at the horizontal sweep frequency and of a sinusoidal signal having a frequency which is a multiple of said horizontal sweep frequency.

15. A system according to claim 10 wherein said second generating means supplies a sinusoidal signal.

16. A system according to claim 10 wherein said first and second generating means supply parabolic signals.

17. A system according to claim 10 wherein said further means for applying said variable potential is adjusted for providing a satisfactory compensation of said deviation in the direction of said screen normal to said strips, disregarding the compensation obtained for said deviation in the direction parallel to said strips.

18. A colour television image reproducing system including a picture tube, said tube comprising: three guns for generating three beams; a screen comprising phosphor elements of different colours; an electron permeable focusing electrode parallel to said screen and adapted to form therewith a convergent system for said beams through applying to said focusing electrode a potential lower than the potential of said screen; said guns being adapted for converging said beams in the immediate vicinity of said focusing electrode; a horizontal deflection system and a vertical deflection system for simultaneously deflecting said beams and sweeping therewith said focusing electrode; a peripherical electrode surrounding the space portion swept by said beams between said guns and the vicinity of said focusing electrode; two correcting electrodes, located between and insulated from said peripherical electrode and said focusing electrode, and shaped for attracting the electrons from said beams so as to compensate, at least partially, in at least one direction parallel to said screen, the deviation imparted to said beams in the space portion comprised between said focusing electrode and said screen; said image reproducing system further including a direct current voltage source for applying said focusing electrode potential to said focusing electrode and to said peripherical electrode, a horizontal and a vertical sweep circuit for respectively feeding said horizontal and vertical deflection systems and further means for applying to said correcting electrode respective potentials which are variable as a function of the instantaneous position of said beams; said further means comprising: a first generating means, connected to said horizontal sweep circuit, for generating a first signal at the horizontal sweep frequency, said first signal presenting a minimum corresponding to the sweeping of the points on the vertical axis of the screen of the tube by said beams, means for applying said first signal to one of said correcting electrodes; a second generating means, connected to said vertical sweep circuit; for generating a second signal at the vertical sweep frequency, said second signal having a minimum corresponding to the sweeping of the horizontal axis of the screen of the tube by said beams; and means for applying said second signal to the other correcting electrode.

References Cited by the Examiner
UNITED STATES PATENTS

| | | | |
|---|---|---|---|
| 2,153,269 | 4/39 | Nicoll | 315—16 |
| 3,005,921 | 10/61 | Godfrey | 313—85 |

DAVID G. REDINBAUGH, *Primary Examiner*.